Patented Sept. 1, 1925.

1,552,058

UNITED STATES PATENT OFFICE.

GEORG KALISCHER, OF MAINKUR, NEAR FRANKFORT-ON-THE-MAIN, AND KARL KELLER, OF FRANKFORT-ON-THE-MAIN, GERMANY, ASSIGNORS TO LEOPOLD CASSELLA & CO. GESELLSCHAFT MIT BESCHRÄNKTER HAFTUNG, A CORPORATION OF GERMANY.

PROCESS FOR THE PRODUCTION OF NEW DERIVATIVES OF THE ARYLIDES OF 2.3 HYDROXYNAPHTHOIC ACID.

No Drawing.      Application filed March 24, 1925. Serial No. 18,053.

*To all whom it may concern:*

Be it known that we, GEORG KALISCHER, a citizen of the German Republic, residing at Mainkur, near Frankfort-on-the-Main, Germany, and KARL KELLER, a citizen of the German Republic, residing at Frankfort-on-the-Main, Germany, have invented a process for the production of new derivatives of the arylides of 2.3-hydroxynaphthoic acid, of the general formula:

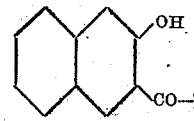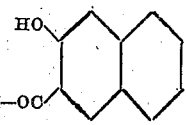

wherein R means an aryl residue, X an azo group —N=N— or an azoxy group—

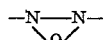
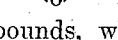

The new compounds, which are soluble in alkaline solutions, may be obtained either by condensing the chloride of 2.3-hydroxynaphthoic acid or its o-acyl derivatives with aromatic diaminoazoxy-or-azo bodies and subsequently saponifying the acyl group, when using an o-acyl derivative, or by treating the nitroarylides of 2.3-hydroxynaphthoic acid with reducing agents in alkaline solution. As such a reducing agent dextrose may be used also arsenious acid, zinc-dust, formaldehyde and similar products.

The new compounds are to be used as intermediates for the production of azo dyestuffs.

The following examples illustrate the invention, the parts being by weight and all temperatures in centigrade degrees.

*Example 1.*

30.8 parts meta-nitranilide of 2.3-hydroxynaphthoic acid are dissolved with 22 parts caustic soda solution (40° Bé.) and 200 parts hot water. Into the solution, diluted with 300 parts of water, a solution of 12 parts dextrose in 40 parts water is poured at about 65° and a temperature of 60–70° maintained for 1–2 hours. From the yellowish brown solution the new product of reduction is advantageously separated as salt of sodium by adding common salt and then in an aqueous suspension converted into the free state by treating with a mineral acid. The raw product may be purified by redissolving it in diluted hot alkaline solution and precipitating again as salt of sodium.

The sym.-bis-(2.3-hydroxynaphthoyl)-m.m'-diaminoazoxy-benzene, having the formula:

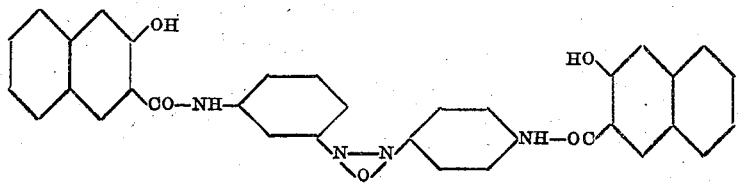

thus obtained is distinguished from the parent body by its much lesser solubility in organic solvents. It is only very sparingly soluble in glacial acetic acid and monochlorobenzene. Crystallized from nitrobenzene it forms a brownish crystalline powder, dissolving in sulfuric acid with an intensely yellow color and decomposing above 285° without melting.

*Example 2.*

If, instead of the meta-nitranilide of 2.3-hydroxynaphthoic acid, used in example 1, the nitrotoluidide of the formula—

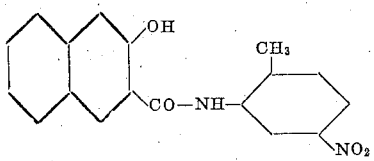

is subjected to the same treatment, a body of very similar properties is obtained. The quantity of dextrose may vary considerably without substantially changing the result, also instead of dextrose, zinc-dust or sulfide of sodium or similar reducing agents may be used.

In the same manner also other nitro derivatives of the arylides of 2.3-hydroxynaphthoic acid can be used, such as the condensation products of 2.3-hydroxynaphthoic acid with metanitro-ortho-anisidine ($OCH_3$:-$NH_2$:$NO_2$=1:2:4), ortho-chloro-meta-nitraniline (Cl:$NH_2$:$NO_2$=1:2:4), para-nitraniline m-nitro-ortho-toluidine ($CH_3$:-$NH_2$:$NO_2$=1:2:5), ortho-chloro-para-nitraniline (Cl:$NH_2$:$NO_2$=1:2:5), para-nitro-ortho-anisidine ($OCH_3$:$NH_2$:$NO_2$=1:-2:5), chloronitroanisidines (Cl:$NH_2$:-$OCH_3$:$NO_2$=1:2:4:5 and $OCH_3$:$NH_2Cl$:-$NO_2$=1:2:4:5), nitrocresidine ($OCH_3$:-$NH_2$:$CH_3$:$NO_2$=1:2:4:5) nitroamidohydroquinonedimethylether ($OCH_3$ : $NH_2$:-$OCH_3$:$NO_2$=1:2:4:5) and others.

The bodies, obtained therefrom, are derivatives of the arylides of 2.3-hydroxynaphthoic acid of the benzene series, having the general formula:

 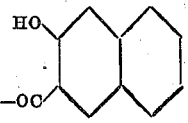

wherein X means an azo group —N=N— or an azoxy group $$-N\!-\!N-$$
$$\diagdown O \diagup$$

Y hydrogen or a monovalent substituent.

In the same manner also the corresponding derivatives of the arylides of 2.3-hydroxynaphthoic acid of the naphthalene series may be obtained.

The same products are formed by condensing the chloride of 2.3-hydroxynaphthoic acid or its *o*-acyl derivatives with the corresponding diaminoazoxy-or-azo compounds and saponifying subsequently the acyl group, when using an *o*-acyl derivative, according to the methods, customary for the production of aromatic acylamino compounds.

Having now particularly described and ascertained the nature of our said invention and in what manner the same is to be performed, we declare, that what we claim is:

1. As new compounds derivatives of the arylides of 2.3-hydroxynaphthoic acid, having the general formula:

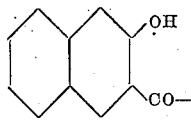 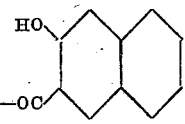

wherein R means an aryl residue. X an azo group —N=N— or an azoxy group
$$-N\!-\!N-$$
$$\diagdown O \diagup$$

2. A process of making new derivatives of the arylides of 2:3-hydroxynaphthoic acid by treating nitroarylides of 2.3-hydroxynaphthoic acid with reducing agents in an alkaline solution.

3. As new compounds derivatives of the arylides of 2.3-hydroxynaphthoic acid of the benzene series, having the general formula:

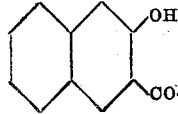 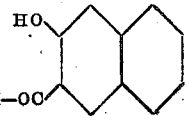

wherein X means an azo group —N=N— or azoxy group

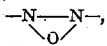

Y hydrogen or a monovalent substituent.

4. A process of making new derivatives of the arylides of 2.3-hydroxynaphthoic acid of the benzene series by treating nitroarylides of 2.3-hydroxynaphthoic acid of the benzene series with reducing agents in an alkaline solution.

5. As a new compound the sym.-bis-(2.3-hydroxynaphthoyl)-meta-meta[1]-diamido-azoxybenzene, having probably the formula:

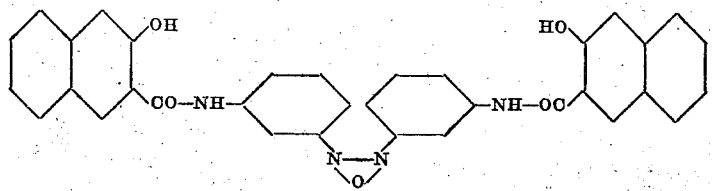

6. A process of making a new derivative of the arylides of 2.3-hydroxynaphthoic acid by treating the meta-nitranilide of 2.3-hydroxynaphthoic acid with reducing agents in an alkaline solution.

In witness whereof we have hereunto signed our names this eleventh day of March, 1925.

GEORG KALISCHER.
KARL KELLER.